(12) United States Patent
Takamatsu et al.

(10) Patent No.: US 7,758,074 B2
(45) Date of Patent: Jul. 20, 2010

(54) WEBBING RETRACTOR, WEBBING RETRACTING METHOD, AND VEHICLE

(75) Inventors: Hitoshi Takamatsu, Niwa-gun (JP); Tomonori Nagata, Niwa-gun (JP); Kazuhiko Aihara, Niwa-gun (JP); Masaki Yasuda, Niwa-gun (JP); Toshio Nakashima, Niwa-gun (JP)

(73) Assignee: Kabushiki Kaisha Tokai-Rika-Denki-Seisakusho, Aichi (JP)

( * ) Notice: Subject to any disclaimer, the term of this patent is extended or adjusted under 35 U.S.C. 154(b) by 580 days.

(21) Appl. No.: 10/594,274

(22) PCT Filed: Mar. 2, 2005

(86) PCT No.: PCT/JP2005/003445

§ 371 (c)(1),
(2), (4) Date: Apr. 13, 2007

(87) PCT Pub. No.: WO2005/092678

PCT Pub. Date: Oct. 6, 2005

(65) Prior Publication Data

US 2007/0290496 A1 Dec. 20, 2007

(30) Foreign Application Priority Data

Mar. 26, 2004 (JP) .............................. 2004-091408
Jul. 27, 2004 (JP) .............................. 2004-218487

(51) Int. Cl.
*B60R 22/36* (2006.01)
(52) U.S. Cl. ................ 280/806; 297/470; 297/476; 297/478; 297/479; 297/480
(58) Field of Classification Search ................ 280/806, 280/805, 807; 297/470, 474, 475, 476, 478, 297/479, 480
See application file for complete search history.

(56) References Cited

U.S. PATENT DOCUMENTS

| 5,526,996 A | 6/1996 | Ebner et al. |
| 6,435,441 B1 | 8/2002 | Kajiyama et al. |

FOREIGN PATENT DOCUMENTS

| DE | 43 14 883 A1 | 11/1994 |
| DE | 195 24 501 A1 | 1/1996 |
| EP | 0 970 857 A1 | 1/2000 |
| JP | 9-164911 A | 6/1997 |
| JP | 10-500648 A | 1/1998 |
| JP | 2001-58559 A | 3/2001 |

OTHER PUBLICATIONS

European Search Report dated Mar. 4, 2009 from corresponding European Patent Application No. EP 05 71 9760.

*Primary Examiner*—Eric Culbreth
(74) *Attorney, Agent, or Firm*—Roberts Mlotkowski Safran & Cole, P.C.; Thomas W. Cole (57) ABSTRACT

A webbing retractor is provided that reduces the amount of webbing that is pulled-out after operation of a pretensioner mechanism. In a webbing retractor 10, a lock pawl 78 is set in a non-meshable state in which it cannot mesh with a lock gear 26. At a time when a pretensioner mechanism 34 operates and a clutch plate 42 rotates in a take-up direction, a lock stopper 86 rotates together with the clutch plate 42 and releases engagement with the lock pawl 78. Therefore, the lock pawl 78 is rotated by a compression coil spring 70 and changed to a meshable state. In this way, immediately after rotational force in a pull-out direction is applied to the lock gear 26 due to load from a vehicle occupant after operation of the pretensioner mechanism 34, the lock pawl 78 meshes with the lock gear 26, and pulling-out of a webbing 20 is impeded. Therefore, an amount of the webbing 20 which is pulled-out can be reduced.

22 Claims, 6 Drawing Sheets

WEBBING RETRACTOR, WEBBING RETRACTING METHOD, AND VEHICLE

TECHNICAL FIELD

The present invention relates to a webbing retractor and a webbing retracting method in which a webbing is taken-up due to a pretensioner mechanism being operated, and to a vehicle equipped with the webbing retractor.

BACKGROUND TECHNOLOGY

There are in the prior art webbing retractors equipped with a pretensioner mechanism and a sensor lock mechanism. The pretensioner mechanism takes-up a webbing by being operated at the time of an emergency of a vehicle. At the time when the sensor lock mechanism senses that the pull-out acceleration of the webbing has become greater than or equal to a predetermined acceleration, the sensor lock mechanism is operated and locks the pulling-out of the webbing.

In this webbing retractor, after operation (after the conclusion of operation) of the pretensioner mechanism, pulling-out of the webbing is impeded due to the sensor lock mechanism being operated.

However, the sensor lock mechanism is operated at the time when the sensor lock mechanism senses that the pull-out acceleration of the webbing has become greater than or equal to the predetermined acceleration. Therefore, the webbing is pulled-out from after the operation of the pretensioner mechanism until the operation of the sensor lock mechanism.

Problems to be Solved by the Invention

In view of the above-described circumstances, an object of the present invention is to provide a webbing retractor, a webbing retracting method, and a vehicle which can reduce the amount of a webbing which is pulled-out after operation of a pretensioner mechanism. Further, an object of the present invention is to provide a webbing retractor and a vehicle which can make substantially constant the load which is applied to a vehicle occupant from a webbing after operation of a pretensioner mechanism.

SUMMARY OF THE INVENTION

The webbing retractor of the invention comprises: a rotating member by which, due to the rotating member being rotated in a take-up direction, a webbing is taken-up, and by which, due to the rotating member being rotated in a pull-out direction, the webbing is pulled-out; a pretensioner mechanism which, by being operated, rotates the rotating member in the take-up direction; and an engaging member which, at a time of operation of the pretensioner mechanism, is changed from a non-engageable state in which the engaging member cannot engage with the rotating member to an engageable state in which the engaging member does not engage with the rotating member to which rotational force in the take-up direction is applied and engages with the rotating member to which rotational force in the pull-out direction is applied, the engaging member impeding rotation of the rotating member by engaging with the rotating member.

In such a webbing retractor, the engaging member is set in a non-engageable state and cannot engage with the rotating member. Further, due to the pretensioner mechanism being operated, the rotating member is rotated in the take-up direction and the webbing is taken-up.

Here, when the pretensioner mechanism operates, the engaging member is changed from the non-engageable state to the engageable state.

The engaging member which is in the engageable state does not engage with the rotating member to which rotational force in the take-up direction is applied. Therefore, rotation of the rotating member in the take-up direction due to the operation of the pretensioner mechanism is permitted.

Further, the engaging member which is in the engageable state engages with the rotating member to which rotational force in the pull-out direction is applied, and impedes rotation of the rotating member. Therefore, when rotational force in the pull-out direction is applied to the rotating member after operation (after the conclusion of operation) of the pretensioner mechanism, the engaging member immediately engages with the rotating member. In this way, rotation of the rotating member is impeded, and pulling-out of the webbing is impeded. Accordingly, the amount of the webbing which is pulled-out after operation of the pretensioner mechanism can be reduced.

The webbing retractor of the invention may further comprise: an urging component for urging the engaging member toward the engageable state; and a moving member which, by engaging with the engaging member, sets the engaging member in the non-engageable state, and, due to the moving member being moved due to operation of the pretensioner mechanism, engagement of the moving member with the engaging member is released and the engaging member is changed to the engageable state by the urging component.

The urging component urges the engaging member toward the engageable state. Due to the moving member engaging with the engaging member, the engaging member is set in the non-engageable state. Here, the moving member is moved due to the operation of the pretensioner mechanism. In this way, the engagement of the moving member with the engaging member is released, and the engaging member is changed to the engageable state by the urging component. Therefore, the engaging member can be changed from the non-engageable state to the engageable state by a simple structure.

The webbing retractor of the invention may further comprise recited: a moving/urging member which, by being moved due to operation of the pretensioner mechanism, urges the engaging member and changes the engaging member from the non-engageable state to the engageable state.

Due to the moving/urging member being moved by operation of the pretensioner mechanism, the moving/urging member urges the engaging member and changes the engaging member from the non-engageable state to the engageable state. Therefore, the engaging member can be changed from the non-engageable state to the engageable state by a simple structure.

The engageable state of the engaging member is may be maintained after operation of the pretensioner mechanism.

Therefore, at the time when rotational force in the pull-out direction is applied to the rotating member, the engaging member can reliably engage the rotating member.

The webbing retractor of the invention may also comprise: a webbing applied to a vehicle occupant; a pretensioner mechanism, the webbing being taken-up due to the pretensioner mechanism being operated; and a maintaining component for, after conclusion of operation of the pretensioner mechanism, maintaining a load, which is applied from the webbing to the vehicle occupant, at the load at a time of the conclusion of operation of the pretensioner mechanism.

The webbing may be taken-up due to operation of the pretensioner mechanism.

Here, the maintaining component maintains the load, which is applied from the webbing to the vehicle occupant after the conclusion of operation of the pretensioner mechanism, at the load at the time of the conclusion of operation of the pretensioner mechanism. Therefore, the load applied from the webbing to the vehicle occupant after operation (after the conclusion of operation) of the pretensioner mechanism can be kept substantially constant.

The invention also includes a webbing retracting method comprising the steps of: taking-up a webbing by operating a pretensioner mechanism; and at a time of operation of the pretensioner mechanism, changing an engaging member from a state in which pulling-out of the webbing cannot be impeded to a state in which taking-up of the webbing is permitted and pulling-out of the webbing is impeded.

Effects of the Invention

In the present invention, the amount of the webbing which is pulled-out after the pretensioner mechanism operates can be reduced. Further, in the present invention, the load which is applied to the vehicle occupant from the webbing after the pretensioner mechanism operates can be kept substantially constant.

BEST MODES FOR IMPLEMENTING THE INVENTION

First Embodiment

Figure 1:
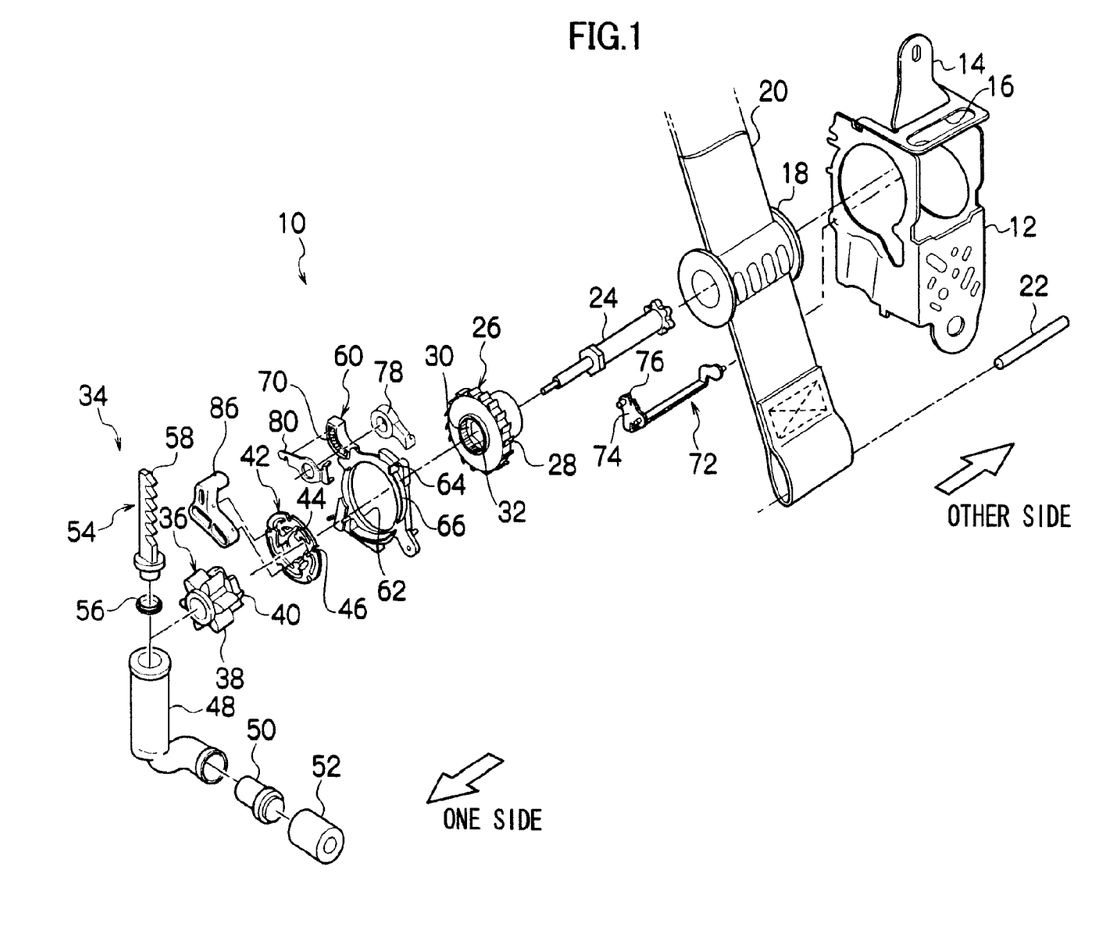
FIG. 1 is an exploded perspective view, as seen from above one side at an incline, showing main portions of a webbing retractor relating to a first embodiment of the present invention.

Main portions of a webbing retractor 10 relating to a first embodiment of the present invention are shown in FIG. 1 in an exploded perspective view as seen from above one side at an incline.

The webbing retractor 10 relating to the present embodiment has a frame 12 which is shaped as a substantially U-shaped plate as seen in top view. The frame 12 is fixed to the interior of a vehicle passenger compartment. A connecting piece 14 spans between the top end of one side wall and the top end of another side wall of the frame 12. The connecting piece 14 is fixed to the interior of the vehicle passenger compartment. An insert-through hole 16 is formed in the connecting piece 14.

A spool 18 (take-up shaft), which accommodates a force limiter mechanism, is supported so as to be freely rotatable between the one side wall and the other side wall of the frame 12. An elongated, belt-shaped webbing 20 is taken-up on the spool 18. A solid-cylindrical shaft 22 provided at the proximal end of the webbing 20 is anchored to the spool 18. A vicinity of the proximal end of the webbing 20 is inserted-through the spool 18. In this way, the webbing 20 is anchored to the spool 18. Further, in a vicinity of the portion which is taken-up on the spool 18, the webbing 20 is inserted-through the aforementioned insert-through hole 16. The webbing 20 is applied to an occupant of the vehicle. The webbing 20 is taken-up due to the spool 18 being rotated in a take-up direction. On the other hand, the webbing 20 is pulled-out due to the spool 18 being rotated in a pull-out direction.

A torsion shaft 24 (energy absorbing member), which comprises the force limiter mechanism and a maintaining component, is disposed at the central axis portion of the spool 18. The torsion shaft 24 can torsionally deform due to the application of a torsional load of a predetermined load or more. The other side end of the torsion shaft 24 is anchored to the other side end of the spool 18. The torsion shaft 24 rotates integrally with the spool 18.

A lock gear 26, which serves as a rotating member of the force limiter mechanism, is provided at the one side of the spool 18. The lock gear 26 is anchored at a vicinity of the one side end of the torsion shaft 24. The lock gear 26 rotates integrally with the torsion shaft 24 and the spool 18 at times other than when the torsion shaft 24 is torsionally deformed.

Ratchet teeth 28 are formed at the outer periphery of the lock gear 26. A substantially cylindrical knurled hole 30 is formed in the central side of the lock gear 26. The knurled hole 30 opens toward the one side. The entire outer periphery of the knurled hole 30 is subjected to knurling, such that a knurled surface 32 is formed.

A pretensioner mechanism 34 is provided at the outer side of the one side wall of the frame 12. The pretensioner mechanism 34 has a pinion 36. The pinion 36 is disposed at the one side of the lock gear 26. The pinion 36 is supported at the torsion shaft 24 so as to be freely rotatable. Pinion teeth 38 are formed at the one side portion of the pinion 36. On the other hand, a cam 40 is formed at the other side portion of the pinion 36. Convex and concave portions are formed alternately at the outer periphery of the cam 40. The cam 40 is inserted into the knurled hole 30. The cam 40 does not contact the knurled surface 32. In this way, the lock gear 26 can rotate independently of the pinion 36.

The pretensioner mechanism 34 has a clutch plate 42. The clutch plate 42 is disposed between the lock gear 26 and the pinion 36. A plurality of meshing claws 44 are formed at the central side of the clutch plate 42. The respective meshing claws 44 project-out from the clutch plate 42 toward the other side. The respective meshing claws 44 fit-together with the respective concave portions of the cam 40. In this way, the clutch plate 42 is mounted to the pinion 36. The respective meshing claws 44 are, together with the cam 40, inserted into the knurled hole 30. The respective meshing claws 44 do not contact the knurled surface 32. In this way, the lock gear 26 can rotate independently of the clutch plate 42. Further, a plurality of cut-outs 46 are formed in the outer periphery of the clutch plate 42.

The pretensioner mechanism 34 has a cylinder 48 which is shaped as a substantially L-shaped cylindrical tube. The cylinder 48 is fixed to the outer side of the one side wall of the frame 12, beneath the pinion 36. A gas generator 50 is provided at the lower side end of the cylinder 48. A generator cap 52, which is shaped as a cylindrical tube having a floor, is fixed at the lower side end of the cylinder 48. The gas generator 50 closes the lower side end of the cylinder 48 in the state in which the generator cap 52 is placed thereon.

The pretensioner mechanism 34 has a piston 54 (restricting member): The piston 54 is inserted into the cylinder 48 from the top end of the cylinder 48. An O-ring 56 is provided at the lower end of the piston 54. The O-ring 56 seals the region between the lower end of the piston 54 and the cylinder 48. Further, a rack 58 is formed at a region other than the lower end of the piston 54.

Figure 2:
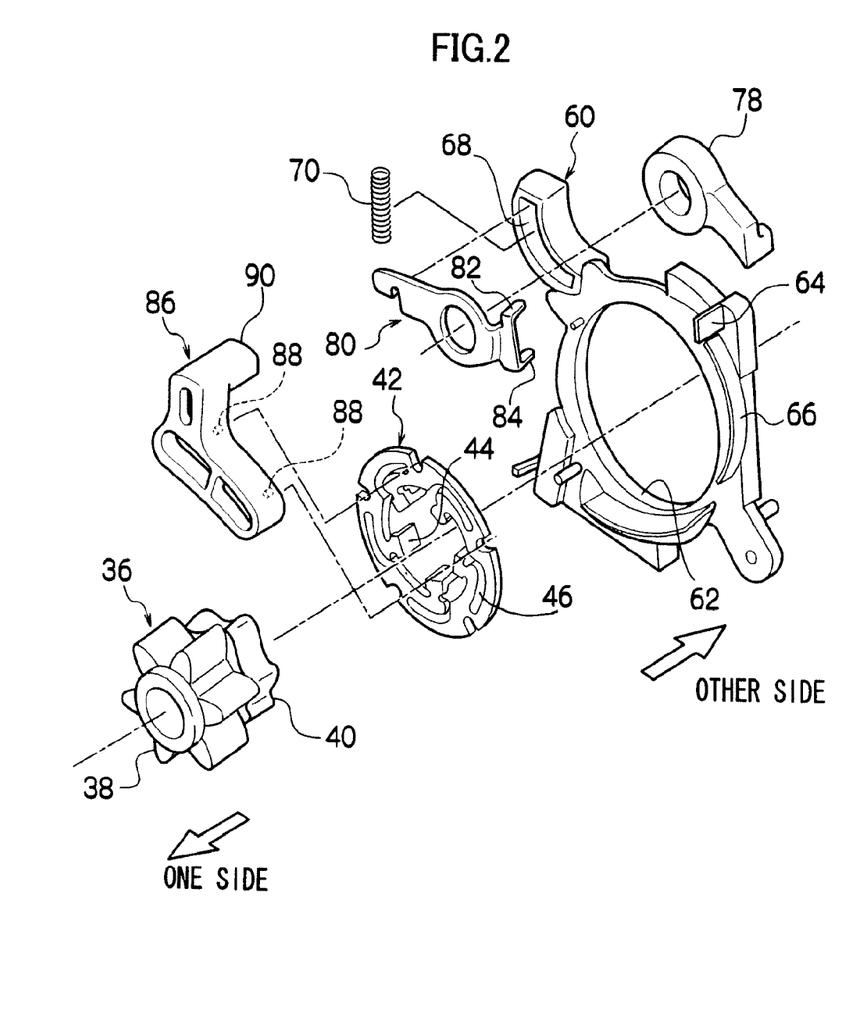
FIG. 2 is an exploded perspective view, as seen from above the one side at an incline, showing in detail characteristic portions in the webbing retractor relating to the first embodiment of the present invention.

As shown in detail in FIG. 2, a gear case 60 is provided between the one side wall of the frame 12 and the pretensioner mechanism 34. The gear case 60 covers the one side of the lock gear 26. A circular through-hole 62 is formed in the center of the gear case 60. The through-hole 62 exposes the knurled hole 30 of the lock gear 26. A flat-plate-shaped stopper plate 64 stands erect perpendicularly at the upper end of the gear case 60. The stopper plate 64 is disposed parallel to the vertical direction. A curved-plate-shaped guide plate 66 stands erect perpendicularly at the peripheral portion of the gear case 60. The guide plate 66 extends in the take-up direction from the lower end of the stopper plate 64 along the outer periphery of the through-hole 62. An accommodating hole 68 is formed at the diagonally upper portion of the gear case 60. The accommodating hole 68 is formed in the shape of a rectangular column which is curved in an arc-shape. The accommodating hole 68 opens toward the one side. A compression coil spring 70 serving as an urging component is accommodated in the accommodating hole 68.

A lock member 72 spans between the one side wall and the other side wall of the frame 12. A lock plate 74 is provided at the one side end of the lock member 72. At the one end, the lock plate 74 is supported so as to be freely rotatable at the lower portion of the gear case 60. The lock plate 74 is disposed diagonally beneath the lock gear 26. Lock teeth 76 are formed at the other end of the lock plate 74. The lock plate 74 is disposed at a non-meshable position at the side opposite the lock gear 26. The lock plate 74 is in a non-meshable state in which the lock teeth 76 cannot mesh with the ratchet teeth 28 of the lock gear 26.

As shown in detail in FIG. 2, a lock pawl 78, which serves as an engaging member structuring the maintaining component, is provided at the outer side of the one side wall of the frame 12, diagonally above the lock gear 26. At one end, the lock pawl 78 is rotatably supported at the one side wall of the frame 12. A guide plate 80 is disposed at the one side of the lock pawl 78. The central portion of the guide plate 80 is, together with the lock pawl 78, rotatably supported at the one side wall of the frame 12. One end of the guide plate 80 is inserted into the accommodating hole 68 of the gear case 60. Due to the compression coil spring 70 within the accommodating hole 68, the other end of the guide plate 80 is urged in the direction of rotating toward the lock gear 26. A pair of guide legs 82, 84 are formed at the other end of the guide plate 80. The pair of guide legs 82, 84 project toward the other side. The one guide leg 82 is disposed at the side opposite the lock gear 26. On the other hand, the other guide leg 84 is disposed at the lock gear 26 side. A vicinity of the other end of the lock pawl 78 is disposed between the pair of guide legs 82, 84. The other end of the lock pawl 78 is urged in the direction of rotating toward the lock gear 26 by the one guide leg 82.

A lock stopper 86 serving as a moving member is provided at the one side of the clutch plate 42. The lock stopper 86 is formed in the shape of a substantially rectangular column which is curved along the outer periphery of the through-hole 62 of the gear case 60. A predetermined number (two in the present embodiment) of shear pins 88 are formed at the other side surface of the lock stopper 86. The predetermined number of shear pins 88 are inserted in the predetermined number of cut-outs 46 of the upper portion of the clutch plate 42. In this way, the lock stopper 86 is positioned at the upper portion of the clutch plate 42. A rectangular-column-shaped stopper column 90 is formed at the pull-out direction side end of the lock stopper 86. The stopper column 90 projects from the lock stopper 86 toward the other side, and engages with the lock gear 26 side of the other end of the lock pawl 78. In this way, due to the stopper column 90, the lock pawl 78 is disposed at a non-meshable position (non-engageable position) at the side opposite the lock gear 26, against the urging force of the compression coil spring 70. The lock pawl 78 is in a non-meshable state (non-engageable state) in which the other end of the lock pawl 78 cannot mesh (engage) with the ratchet teeth 28.

Operation of the present embodiment will be described next.

In the webbing retractor 10 having the above-described structure, when it is sensed that the pull-out acceleration of the webbing 20 has become greater than or equal to a predetermined acceleration, or at the time of a rapid deceleration of the vehicle, or the like, the lock plate 74 of the lock member 72 is temporarily rotated toward the meshable position at he lock gear 26 side. In this way, the lock plate 74 is changed to a meshable state in which the lock teeth 76 do not mesh with the ratchet teeth 28 of the lock gear 26 to which rotational force in the take-up direction is applied, and the lock teeth 76 mesh with the ratchet teeth 28 of the lock gear 26 to which rotational force in the pull-out direction is applied.

Further, pull-out load is applied to the webbing 20 from the vehicle occupant, and rotational force in the pull-out direction is applied to the spool 18, the torsion shaft 24 and the lock gear 26. In this way, the lock teeth 76 mesh with the ratchet teeth 28, rotation of the lock gear 26 in the pull-out direction is impeded, and pulling-out of the webbing 20 is impeded.

By the way, the other end of the lock pawl 78 is urged in the direction of rotating toward the lock gear 26, by the compression coil spring 70 via the guide leg 82 of the guide plate 80. The stopper column 90 of the lock stopper 86 is engaged with the lock gear 26 side of the other end of the lock pawl 78. In this way, the lock pawl 78 is disposed at the non-meshable position at the side opposite the lock gear 26, and the other end of the lock pawl 78 is in the non-meshable state in which it cannot mesh with the ratchet teeth 28 of the lock gear 26.

Here, at the time of an emergency (e.g., at the time of a rapid deceleration) of the vehicle, the pretensioner mechanism 34 is operated, and the gas generator 50 generates gas. In this way, the piston 54, together with the O-ring 56, is raised (moved) within the cylinder 48, and the rack 58 of the piston 54 meshes with the pinion teeth 38 of the pinion 36, and the pinion 36 is rotated in the take-up direction. Therefore, the pinion 36 is rotated relative to the clutch plate 42, and the respective meshing claws 44 of the clutch plate 42 mesh with the respective convex portions of the cam 40 of the pinion 36. In this way, the respective meshing claws 44 of the clutch plate 42 are moved toward the radial direction outer side of the clutch plate 42, and mesh with the knurled surface 32 of the lock gear 26. Accordingly, the clutch plate 42 and the lock gear 26 are rotated in the take-up direction, integrally with the pinion 36. Therefore, the torsion shaft 24 and the spool 18 are rotated in the take-up direction integrally with the lock gear 26, and the webbing 20 is taken-up.

At the time when the pretensioner mechanism 34 is operated and the clutch plate 42 is rotated in the take-up direction, the lock stopper 86 is rotated (moved) in the take-up direction together with the clutch plate 42, while being guided by the guide plate 66 of the gear case 60. Further, the stopper column 90 of the lock stopper 86 abuts the stopper plate 64 of the upper end of the gear case 60. In this way, the predetermined number of shear pins 88 of the lock stopper 86 are sheared, and the lock stopper 86 is disposed at a position at which the stopper column 90 abuts the stopper plate 64.

Therefore, the engagement of the stopper column 90 with the other end of the lock pawl 78 is released, and the other end of the lock pawl 78 is rotated toward the lock gear 26 by the urging force of the compression coil spring 70 via the guide leg 82 of the guide plate 80. In this way, the lock pawl 78 is disposed at the meshable position (engageable position) at the lock gear 26 side. Therefore, the lock pawl 78 is changed to the meshable state (engageable state) in which the other end of the lock pawl 78 does not mesh with the ratchet teeth 28 of the lock gear 26 to which rotational force in the take-up direction is applied, and the other end of the lock pawl 78 meshes with the ratchet teeth 28 of the lock gear 26 to which rotational force in the pull-out direction is applied. Note that, at the time when the lock pawl 78 is changed to the meshable state, due to the urging force of the compression coil spring 70, the guide leg 84 of the guide plate 80 is disposed at a position abutting the ratchet teeth 28 which are rotated, and the other end of the lock pawl 78 is disposed at a position which does not abut the ratchet teeth 28 which are rotated.

In this way, as described above, at the time when the pretensioner mechanism 34 is operated and the lock gear 26 is rotated in the take-up direction, the other end of the lock pawl 78 does not mesh with the ratchet teeth 28 of the lock gear 26. Therefore, rotation of the lock gear 26 in the take-up direction due to the operation of the pretensioner mechanism 34 is permitted.

On the other hand, after operation (after the conclusion of operation) of the pretensioner mechanism 34, pull-out load is applied to the webbing 20 from the vehicle occupant, and, immediately after rotational force in the pull-out direction is applied to the spool 18, the torsion shaft 24 and the lock gear 26, the other end of the guide plate 80 is rotated toward the lock gear 26 by the rotational force in the pull-out direction of the ratchet tooth 28 which the guide leg 84 of the guide plate 80 abuts first. In this way, the other end of lock pawl 78 is rotated toward the lock gear 26 by the guide leg 82 of the guide plate 80, and meshes with the next ratchet tooth 28 in the take-up direction after that ratchet tooth 28. Therefore, rotation of the lock gear 26 in the pull-out direction is impeded, and pulling-out of the webbing 20 is impeded.

Further, after the rotation of the lock gear 26 in the pull-out direction is impeded by the lock pawl 78 and the pulling-out of the webbing 20 is impeded in this way, at the time when the torsional load applied to the torsion shaft 24 from the vehicle occupant via the webbing 20 and the spool 18 is greater than or equal to a predetermined load, the force limiter mechanism is operated. Namely, due to the torsion shaft 24 being torsionally deformed, the spool 18 is rotated in the pull-out direction independently of the lock gear 26. In this way, the webbing 20 is pulled-out, and the load (energy) applied to the vehicle occupant from the webbing 20 is absorbed.

Due to the above, as compared with a case in which the lock teeth 76 of the lock plate 74 are made to mesh with the ratchet teeth 28 of the lock gear 26 and pulling-out of the webbing 20 is impeded due to it being sensed that the pull-out acceleration of the webbing 20 has become greater than or equal to the predetermined acceleration after the pretensioner mechanism 34 operates, the amount of the webbing 20 which is pulled-out can be reduced from after the operation of the pretensioner mechanism 34 until the operation of the force limiter mechanism.

Further, as described above, due to the operation of the pretensioner mechanism 34, the lock stopper 86 is rotated together with the clutch plate 42, and the engagement of the stopper column 90 with the lock pawl 78 other end is released. In this way, the other end of the lock pawl 78 is rotated toward the lock gear 26 by the urging force of the compression coil spring 70, and the lock pawl 78 is changed from the non-meshable state to the meshable state. Therefore, the lock pawl 78 can be changed from the non-meshable state to the meshable state by a simple structure.

Further, the urging force of the compression coil spring 70 is transferred to the lock pawl 78 via only the guide plate 80. Therefore, the number of parts is smaller, and compactness can be aimed for. Moreover, the responsiveness of the lock pawl 78 with respect to the urging force of the compression coil spring 70 can be made to be good.

By the way, in a conventional webbing retractor, the lock pawl 78 does not impede the rotation of the lock gear 26. Therefore, the rotation of the lock gear is first impeded by the lock plate and the pulling-out of the webbing is impeded, due to it being sensed that the pull-out acceleration of the webbing has become greater than or equal to the predetermined acceleration after the pretensioner mechanism operates. Further, rotational force in the take-up direction due to the pretensioner mechanism is applied to the one end side of the torsion shaft. Moreover, impeding of rotation of the lock gear by the lock plate is carried out at the other end side of the torsion shaft. Therefore, when the force limiter mechanism operates after operation of the pretensioner mechanism, the one end side of the torsion shaft is rotated in the pull-out direction, and the torsion shaft is torsionally deformed. In this way, at the pretensioner mechanism, the piston is moved in the direction of being returned to the interior of the cylinder.

Figure 6:
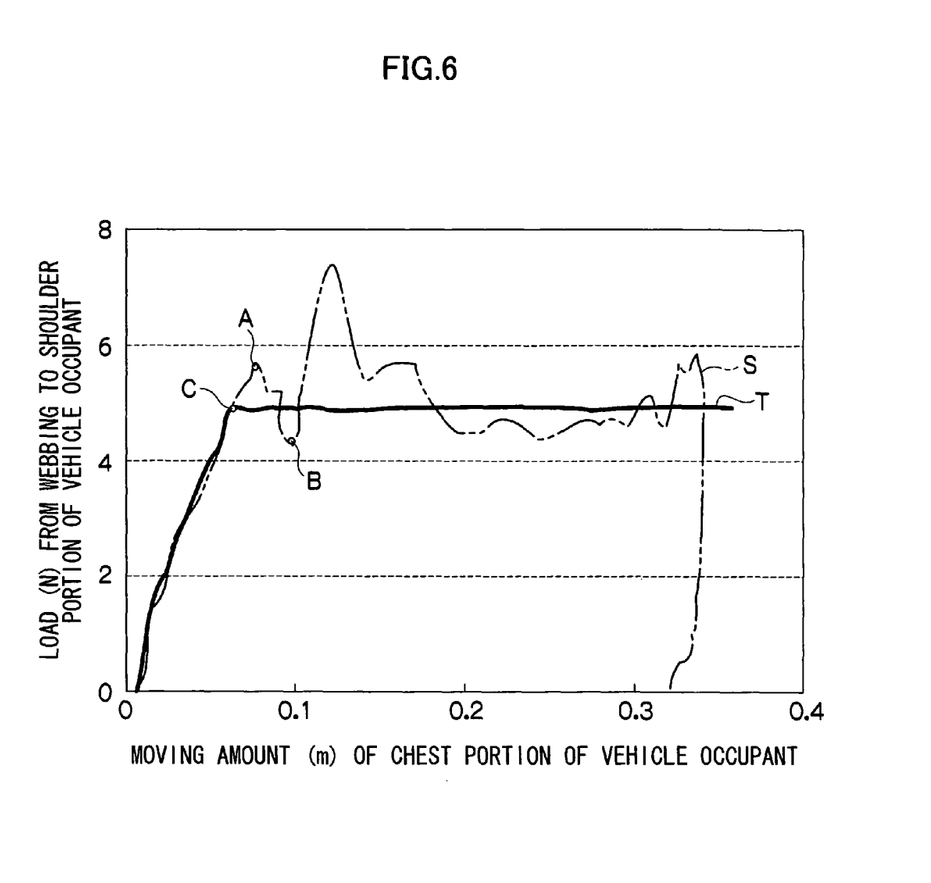
FIG. 6 is a graph showing the relationship between an amount of movement of a chest portion of a vehicle occupant (horizontal axis) and a load applied from a webbing to a shoulder portion of a vehicle occupant (vertical axis) after the start of operation of pretensioner mechanisms, for the webbing retractors relating to the first embodiment and the second embodiment of the present invention and a conventional webbing retractor.

Therefore, as shown by two-dot chain line S in FIG. 6, the amount of the webbing which is pulled-out becomes large from operation conclusion time point A of the pretensioner mechanism to rotation impeding time point B of the lock gear by the lock plate. In this way, the load which is applied from the webbing to the vehicle occupant (the shoulder portion of the vehicle occupant) is greatly reduced. Further, when the force limiter mechanism operates after the rotation impeding time point B of the lock gear by the lock plate, at the pretensioner mechanism, the movement of the piston in the direction of being returned to the interior of the cylinder is hindered due to the remaining gas within the cylinder. In this way, the torsional deformation of the torsion shaft due to the rotation of the one end side of the torsion shaft in the pull-out direction is hindered, and the load which is applied from the webbing to the vehicle occupant greatly increases.

On the other hand, in the webbing retractor 10 relating to the present embodiment, the lock pawl 78 impedes rotation of the lock gear 26 immediately after the conclusion of operation of the pretensioner mechanism 34 (before it is sensed that the pull-out acceleration of the webbing 20 has become greater than or equal to the predetermined acceleration). Further, rotational force in the take-up direction due to the pretensioner mechanism 34 is applied to the one side of the torsion shaft 24. Moreover, at the one side of the torsion shaft 24, impeding of the rotation of the lock gear 26 by the lock pawl 78 is carried out. Therefore, when the force limiter mechanism operates after the operation of the pretensioner mechanism 34, the other side of the torsion shaft 24 is rotated in the pull-out direction, and the torsion shaft 24 is torsionally deformed. In this way, at the pretensioner mechanism 34, the piston 54 is not moved in the direction of being returned to the interior of the cylinder 48.

Therefore, as shown by thick line T in FIG. 6, immediately after operation conclusion time point C of the pretensioner mechanism 34, the amount of the webbing 20 which is pulled-out is small. In this way, a reduction in the load applied from the webbing 20 to the vehicle occupant (the shoulder portion of the vehicle occupant) can be suppressed or prevented. Further, when the force limiter mechanism operates after the operation conclusion time point C of the pretensioner mechanism 34, at the pretensioner mechanism 34, the piston 54 is not moved in the direction of being returned to the interior of the cylinder 48. In this way, the load applied from the webbing 20 to the vehicle occupant does not greatly increase.

Therefore, the load applied from the webbing 20 to the vehicle occupant after the conclusion of operation of the pretensioner mechanism 34 is maintained at that load (e.g., within ±0.5 N of that load) at the time of the conclusion of operation of the pretensioner mechanism 34. Accordingly, the load applied from the webbing 20 to the vehicle occupant after the conclusion of operation of the pretensioner mechanism 34 can be kept substantially constant.

Second Embodiment

Figure 3:
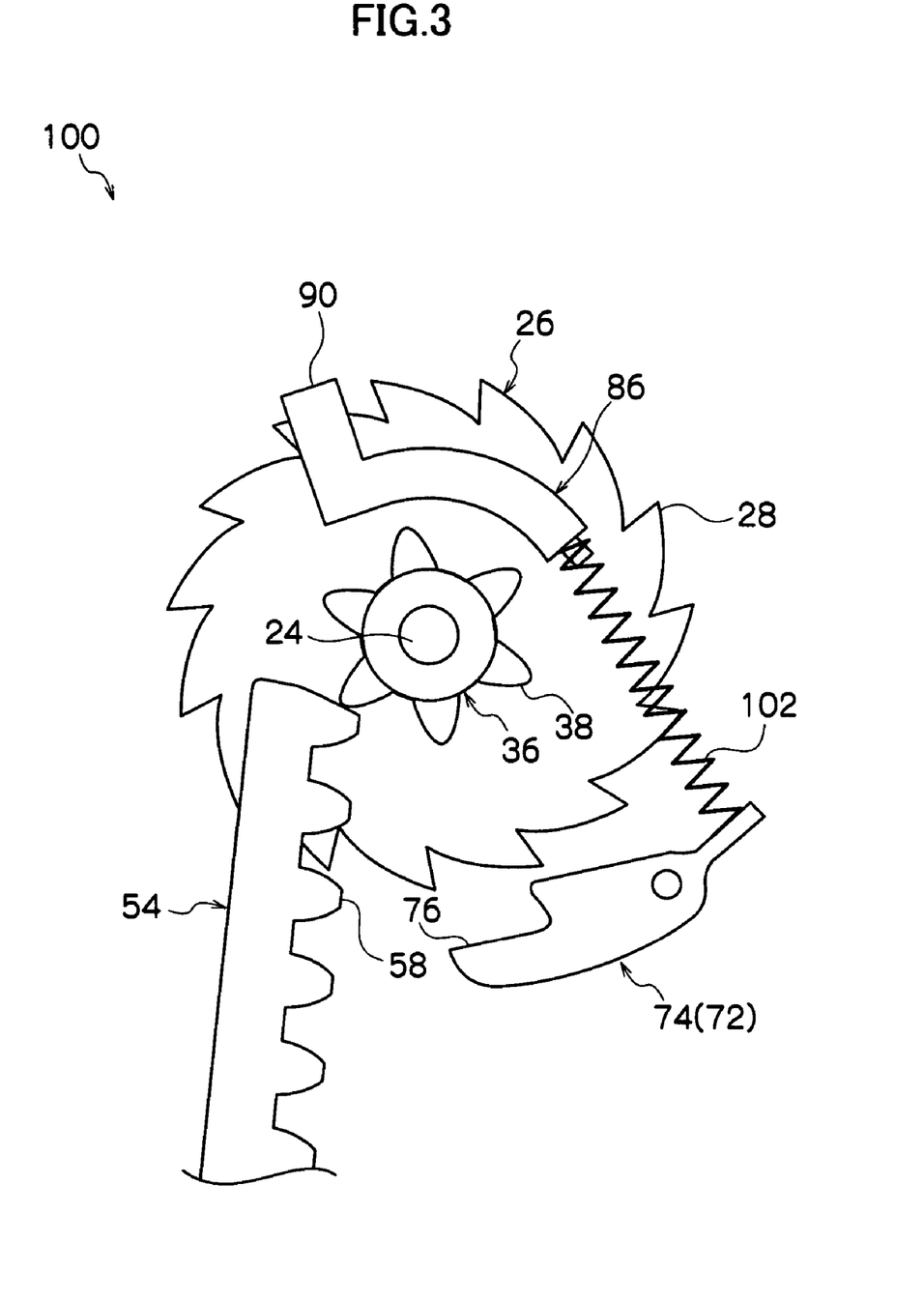
FIG. 3 is a schematic side view (from which a gear case and a clutch plate are omitted), as seen from the one side, showing main portions of a webbing retractor relating to a second embodiment of the present invention.

Main portions of a webbing retractor 100 relating to a second embodiment of the present invention are shown in FIG. 3 in a schematic side view as seen from the one side.

The webbing retractor 100 relating to the present embodiment differs from the above-described first embodiment with respect to the following points.

The compression coil spring 70, the lock pawl 78, and the guide plate 80 of the above-described first embodiment are not provided in the webbing retractor 100.

The lock plate 74 of the lock member 72 is the engaging member which forms the maintaining component. In a vicinity of one end, the lock plate 74 is supported so as to be freely rotatable at the lower portion of the gear case 60. The lock plate 74 is disposed at a non-meshable position (non-engageable position) at the side opposite the lock gear 26. The lock plate 74 is in a non-meshable state (non-engageable state) in which the lock teeth 76 of the other end of the lock plate 74 cannot mesh (engage) with the ratchet teeth 28 of the lock gear 26.

The lock stopper 86 forms a moving/urging member. One end of a coil spring 102, which structures the moving/urging member, is fixed to the take-up direction side end of the lock stopper 86. The coil spring 102 is in the state of its natural length at which it does not apply urging force. The other end of the coil spring 102 extends toward the one end of the lock plate 74.

Operation of the present embodiment will be described next.

In the webbing retractor 100 of the above-described structure, in the same way as in the above-described first embodiment, when it is sensed that the pull-out acceleration of the webbing 20 has become greater than or equal to a predetermined acceleration, or at the time of a rapid deceleration of the vehicle, or the like, the lock plate 74 of the lock member 72 is temporarily rotated to the meshable position and changed to the meshable state. In this way, at the time when pull-out load is applied from the vehicle occupant to the webbing 20, pulling-out of the webbing 20 is impeded.

Here, at the time of an emergency (e.g., at the time of a rapid deceleration) of the vehicle, in the same way as in the above-described first embodiment, the pretensioner mechanism 34 is operated, and the webbing 20 is taken-up.

At the time when the pretensioner mechanism 34 is operated and the clutch plate 42 is rotated in the take-up direction, the lock stopper 86 and the coil spring 102 are rotated (moved) in the take-up direction together with the clutch plate 42, while the lock stopper 86 is guided by the guide plate 66 of the gear case 60. Further, the stopper column 90 of the lock stopper 86 abuts the stopper plate 64 of the upper end of the gear case 60. In this way, the predetermined number of shear pins 88 of the lock stopper 86 are sheared, and the lock stopper 86 and the coil spring 102 are disposed at the position at which the stopper column 90 abuts the stopper plate 64.

Figure 4:
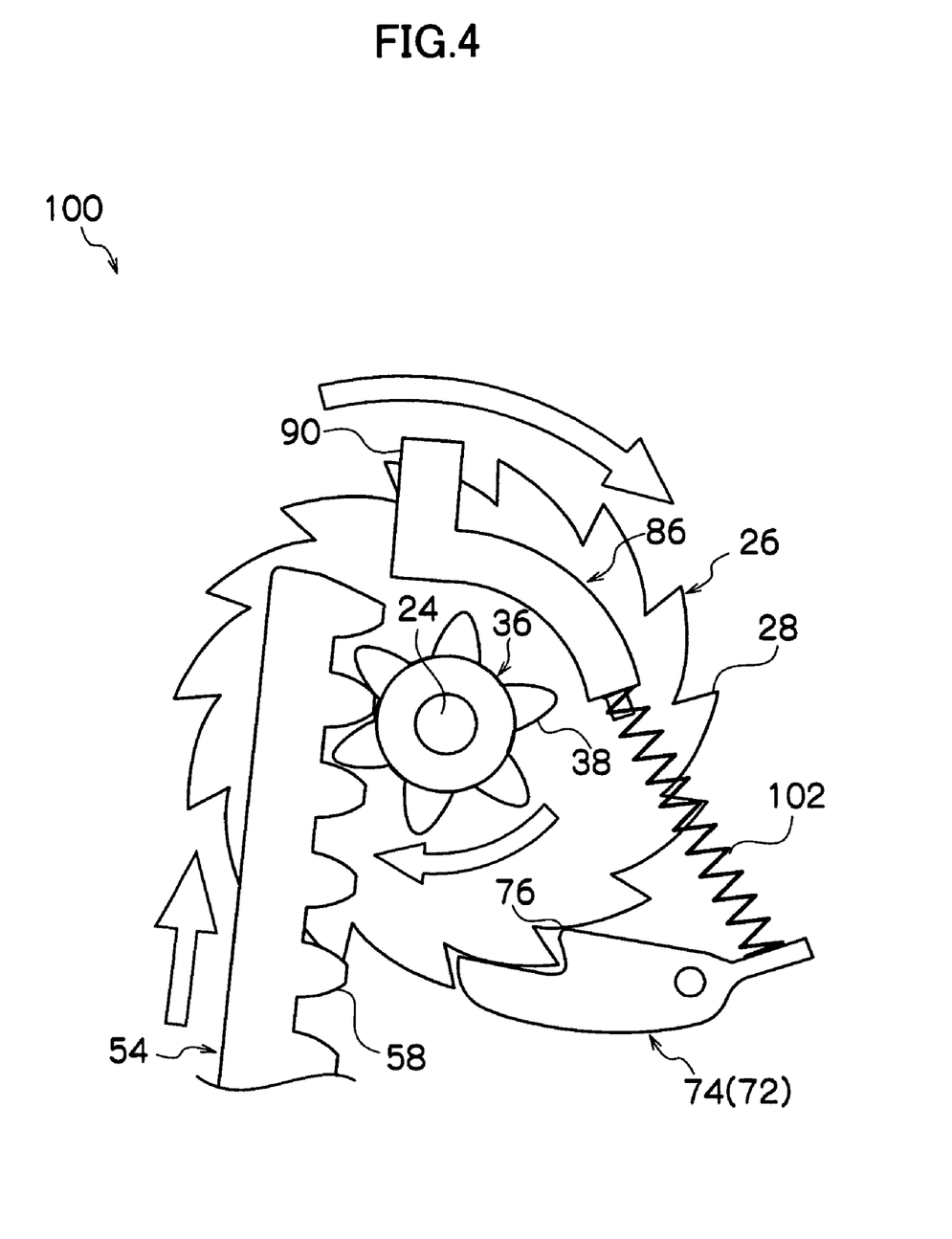
FIG. 4 is a schematic side view, as seen from the one side, showing a state of the main portions at a time when a pretensioner mechanism operates in the webbing retractor relating to the second embodiment of the present invention.

Therefore, as shown in FIG. 4, at the other end, the coil spring 102 in the state of being compressed abuts the one end of the lock plate 74, and the lock teeth 76 of the other end of the lock plate 74 are rotated toward the lock gear 26 by the urging force of the coil spring 102. In this way, the lock plate 74 is disposed at the meshable position (engageable position) at the lock gear 26 side. Therefore, the lock plate 74 is changed to the meshable state (engageable state) in which the lock teeth 76 do not mesh with the ratchet teeth 28 of the lock gear 26 to which rotational force in the take-up direction is applied and the lock teeth 76 mesh with the ratchet teeth 28 of the lock gear 26 to which rotational force in the pull-out direction is applied.

Figure 5:
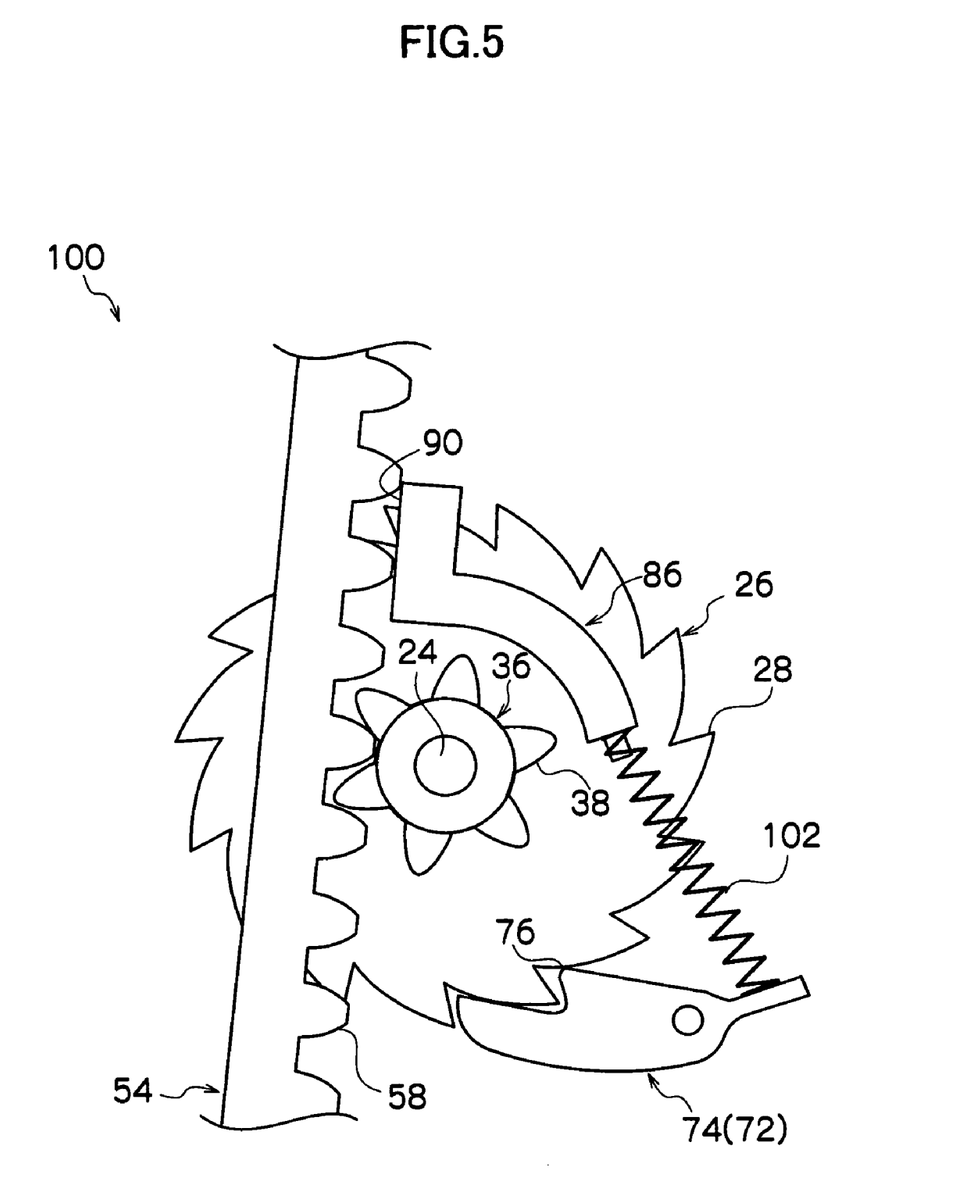
FIG. 5 is a schematic side view, as seen from the one side, showing a state of the main portions after the pretensioner mechanism operates in the webbing retractor relating to the second embodiment of the present invention.

Further, as shown in FIG. 5, after operation (after the conclusion of operation) of the pretensioner mechanism 24, the rack 58 of the piston 54 contacts the stopper column 90 of the lock stopper 86. Therefore, movement of the lock stopper 86 is restricted, and the meshable state of the lock plate 74 is maintained.

In this way, as described above, at the time when the pretensioner mechanism 34 is operated and the lock gear 26 is rotated in the take-up direction, the lock teeth 76 of the lock plate 74 do not mesh with the ratchet teeth 28 of the lock gear 26. Therefore, rotation of the lock gear 26 in the take-up direction due to the operation of the pretensioner mechanism 34 is permitted.

On the other hand, after operation of the pretensioner mechanism 34, immediately after pull-out load is applied from the vehicle occupant to the webbing 20 and rotational force in the pull-out direction is applied to the spool 18, the torsion shaft 24 and the lock gear 26, the lock teeth 76 of the lock plate 74 mesh with the ratchet teeth 28 of the lock gear 26. Therefore, rotation of the lock gear 26 in the pull-out direction is impeded, and pulling-out of the webbing 20 is impeded.

Further, after rotation of the lock gear 26 in the pull-out direction is impeded by the lock plate 74 and pulling-out of the webbing 20 is impeded after the operation of the pretensioner mechanism 34 in this way, at the time when the torsional load applied from the vehicle occupant to the torsion shaft 24 via the webbing 20 and the spool 18 is greater than or equal to a predetermined load, the force limiter mechanism is operated in the same way as in the above-described first embodiment. In this way, the webbing 20 is pulled-out, and the load (energy) applied from the webbing 20 to the vehicle occupant is absorbed.

Due to the above, as compared with a case in which the lock teeth 76 of the lock plate 74 are made to mesh with the ratchet teeth 28 of the lock gear 26 and pulling-out of the webbing 20 is impeded due to it being sensed that the pull-out acceleration of the webbing 20 has become greater than or equal to the predetermined acceleration after the pretensioner mechanism 34 operates, the amount of the webbing 20 which is pulled-out can be made to be small from after the operation of the pretensioner mechanism 34 until the operation of the force limiter mechanism.

Further, as described above, due to the operation of the pretensioner mechanism 34, the lock stopper 86 and the coil spring 102 are rotated together with the clutch plate 42. In this way, the lock teeth 76 of the lock plate 74 are rotated toward the lock gear 26 by the urging force of the coil spring 102, and the lock plate 74 is changed from the non-meshable state to the meshable state. Therefore, the lock plate 74 can be changed from the non-meshable state to the meshable state by a simple structure.

Moreover, after operation of the pretensioner mechanism 34, movement of the lock stopper 86 is restricted by the rack 58 of the piston 54, and the meshable state of the lock plate 74 is maintained. Therefore, at the time when rotational force is applied in the pull-out direction to the lock gear 26, the lock teeth 76 of the lock plate 74 can reliably mesh with the ratchet teeth 28 of the lock gear 26.

Further, the urging force of the coil spring 102 is directly transferred to the lock plate 74. Therefore, as compared with the above-described first embodiment, the number of parts is even fewer, and compactness can be aimed for even more. Moreover, as compared with the above-described first embodiment, the responsiveness of the lock plate 74 with respect to the urging force of the coil spring 102 can be made to be better.

Moreover, the function of the lock plate 74 in the present embodiment serves as both of the functions of the lock plate 74 and the lock pawl 78 in the above-described first embodiment. Therefore, the number of parts can be made to be even fewer.

By the way, in the webbing retractor 100 relating to the present embodiment, the lock plate 74 impedes rotation of the lock gear 26 immediately after the conclusion of operation of the pretensioner mechanism 34 (before it is sensed that the pull-out acceleration of the webbing 20 has become greater than or equal to the predetermined acceleration). Further, rotational force in the take-up direction due to the pretensioner mechanism 34 is applied to one side of the torsion shaft 24. Moreover, at the one side of the torsion shaft 24, impeding of the rotation of the lock gear 26 by the lock plate 74 is carried out. Therefore, when the force limiter mechanism operates after the operation of the pretensioner mechanism 34, the other side of the torsion shaft 24 is rotated in the pull-out direction, and the torsion shaft 24 is torsionally deformed. In this way, at the pretensioner mechanism 34, the piston 54 is not moved in the direction of being returned to the interior of the cylinder 48.

Therefore, as shown by the thick line T in FIG. 6, immediately after the operation conclusion time point C of the pretensioner mechanism 34, the amount of the webbing 20 which is pulled-out is small. In this way, a reduction in the load applied from the webbing 20 to the vehicle occupant (the shoulder portion of the vehicle occupant) can be suppressed or prevented. Further, when the force limiter mechanism operates after the operation conclusion time point C of the pretensioner mechanism 34, at the pretensioner mechanism 34, the piston 54 is not moved in the direction of being returned to the interior of the cylinder 48. In this way, the load applied from the webbing 20 to the vehicle occupant does not greatly increase.

Therefore, the load applied from the webbing 20 to the vehicle occupant after the conclusion of operation of the pretensioner mechanism 34 is maintained at that load (e.g., within ±0.5 N of that load) at the time of the conclusion of operation of the pretensioner mechanism 34. Accordingly, the load applied from the webbing 20 to the vehicle occupant after the conclusion of operation of the pretensioner mechanism 34 can be kept substantially constant.

Note that, in the above-described first embodiment and second embodiment, the lock stopper 86 is a structure which is mounted to the clutch plate 42. However, it suffices for the lock stopper (the moving member or the moving/urging member) to be a structure which is mounted to an operation member (e.g., the pinion 36 or the piston 54) which is operated by the operation of the pretensioner mechanism.

DESCRIPTION OF THE REFERENCE NUMERALS

10 webbing retractor
18 spool (take-up shaft)
20 webbing
24 torsion shaft (maintaining component)
26 lock gear (rotating member)
34 pretensioner mechanism
70 compression coil spring (urging component)
74 lock plate (engaging member, maintaining component)
78 lock pawl (engaging member, maintaining component)
86 lock stopper (moving member, moving/urging member)
100 webbing retractor
102 coil spring (moving/urging member)

The invention claimed is:

1. A webbing retractor comprising:
a rotating member by which, due to the rotating member being rotated in a take-up direction, a webbing is taken-up, and by which, due to the rotating member being rotated in a pull-out direction, the webbing is pulled-out;
a pretensioner mechanism which, by being operated, rotates the rotating member in the take-up direction; and
an engaging member which, due to operation of the pretensioner mechanism, is changed from a non-engageable state in which the engaging member cannot engage with the rotating member to an engageable state in which the engaging member does not engage with the rotating member and which engages with the rotating member only after operation of the pretensioner mechanism and after rotational force in the pull-out direction is applied, whereupon the engaging member immediately impedes rotation of the rotating member by engaging with the rotating member.

2. The webbing retractor of claim 1, further comprising:
an urging component for urging the engaging member toward the engageable state; and
a stopper member which, by engaging with the engaging member, sets the engaging member in the non-engageable state, and, due to the stopper member being moved due to operation of the pretensioner mechanism, engagement of the stopper member with the engaging member is released and the engaging member is changed to the engageable state by the urging component.

3. The webbing retractor of claim 1, further comprising a stopper member which, by being moved due to operation of the pretensioner mechanism, changes the engaging member from the non-engageable state to the engageable state.

4. The webbing retractor of claim 1, wherein the engageable state of the engaging member is maintained after operation of the pretensioner mechanism.

5. The webbing retractor of claim 4, further comprising a restricting member which, by being moved due to operation of the pretensioner mechanism, restricts movement of engaging member and the engageable state of the engaging member is maintained.

6. The webbing retractor of claim 1, further comprising a take-up shaft on which the webbing is taken-up, and at one side of the take-up shaft, the pretensioner mechanism applies rotational force to the rotating member and the engaging member engages the rotating member.

7. A vehicle comprising the webbing retractor of claim 1.

8. A webbing retractor comprising:
a webbing applied to a vehicle occupant;
a pretensioner mechanism, the webbing being taken-up due to the pretensioner mechanism being operated; and
a maintaining component for maintaining a load at a constant level, which is applied from the webbing to the vehicle occupant after the conclusion of operation of the pretensioner mechanism, including a single torsion bar and an engaging member that moves due to operation of the pretensioner mechanism.

9. The webbing retractor of claim 8, further comprising a rotating member by which, due to the rotating member being rotated in a take-up direction, the webbing is taken-up, and by which, due to the rotating member being rotated in a pull-out direction, the webbing is pulled-out, the rotating member being rotated in the take-up direction due to the pretensioner mechanism being operated,
wherein the engaging member, at a time of operation of the pretensioner mechanism, is changed from a non-engageable state in which the engaging member cannot engage with the rotating member to an engageable state in which the engaging member does not engage with the rotating member to which rotational force in the take-up direction is applied and engages with the rotating member to which rotational force in the pull-out direction is applied, the engaging member impeding rotation of the rotating member by engaging with the rotating member.

10. The webbing retractor of claim 9, further comprising:
an urging component for urging the engaging member toward the engageable state; and
a stopper member which, by engaging with the engaging member, sets the engaging member in the non-engageable state, and, due to the stopper member being moved due to operation of the pretensioner mechanism, engagement of the stopper member with the engaging member is released and the engaging member is changed to the engageable state by the urging component.

11. The webbing retractor of claim 9, further comprising a moving/urging stopper member which, by being moved due to operation of the pretensioner mechanism, urges changes the engaging member from the non-engageable state to the engageable state.

12. The webbing retractor of claim 9, wherein the engageable state of the engaging member is maintained after operation of the pretensioner mechanism.

13. The webbing retractor of claim 9, further comprising a take-up shaft on which the webbing is taken-up, and at one side of the take-up shaft, the pretensioner mechanism applies rotational force to the rotating member and the engaging member engages the rotating member.

14. A webbing retracting method comprising:
taking-up a webbing by operating a pretensioner mechanism; and
at a time of operation of the pretensioner mechanism, changing an engaging member from a state in which pulling-out of the webbing cannot be impeded to a state in which taking-up of the webbing is permitted and from a state in which taking-up of the webbing is permitted to a state in which pulling-out of the webbing is impeded, wherein the engaging member impedes pulling-out of the webbing only after operation of the pretensioner mechanism and after rotational force in a webbing pull-out direction is applied.

15. The webbing retracting method of claim 14, further comprising:
rotating a rotating member in a take-up direction by operating the pretensioner mechanism, the webbing being taken-up due to the rotating member being rotated in the take-up direction and the webbing being pulled-out due to the rotating member being rotated in a pull-out direction; and
at the time of operation of the pretensioner mechanism, changing the engaging member from a non-engageable state, in which the engaging member cannot engage with the rotating member, to an engageable state, in which the engaging member does not engage with the rotating member to which rotational force in the take-up direction is applied and engages with the rotating member to which rotational force in the pull-out direction is applied and impedes rotation of the rotating member.

16. The webbing retracting method of claim 15, further comprising:
setting the engaging member in the non-engageable state, by causing a moving member to engage with the engaging member; and
by moving the moving member by operation of the pretensioner mechanism, canceling engagement of the moving member with the engaging member, and changing the engaging member to the engageable state by an urging component which urges the engaging member toward the engageable state.

17. The webbing retracting method of claim 15, further comprising:
changing the engaging member from the non-engageable state to the engageable state by moving a stopper member by operation of the pretensioner mechanism.

18. The webbing retracting method of claim 15, further comprising:
maintaining the engageable state of the engaging member, after operation of the pretensioner mechanism.

19. The webbing retracting method of claim 15, further comprising:
at one side of a take-up shaft on which the webbing is taken-up, the pretensioner mechanism applying rotational force to the rotating member and causing the engaging member to engage with the rotating member.

20. The webbing retracting method of claim 14, further comprising:
after conclusion of operation of the pretensioner mechanism, maintaining a load, which is applied from the webbing to a vehicle occupant to which the webbing is applied, at the load at a time of the conclusion of operation of the pretensioner mechanism.

21. A webbing retractor comprising:
a rotating member by which, due to the rotating member being rotated in a take-up direction, a webbing is taken-up, and by which, due to the rotating member being rotated in a pull-out direction, the webbing is pulled-out;

a lock member which, at a time when it is sensed that a pull-out acceleration of the webbing has become greater than or equal to a predetermined acceleration, or at a time of rapid deceleration of a vehicle, impedes rotation of the rotating member in the pull-out direction;

a pretensioner mechanism which, by being operated, rotates the rotating member in the take-up direction; and an engaging member that is separate from the lock member which, after a time of operation of the pretensioner mechanism, is changed from a non-engageable state in which the engaging member cannot engage with the rotating member to an engageable state in which the engaging member does not engage with the rotating member to which rotational force in the take-up direction is applied and engages with the rotating member to which rotational force in the pull-out direction is applied, the engaging member impeding rotation of the rotating member by engaging with the rotating member.

22. A webbing retractor comprising:

a rotating member directly connected to a webbing spool by which, due to being rotated in a take-up direction, a webbing is taken-up, and by which, due to the rotating member being rotated in a pull-out direction, the webbing is pulled-out;

a lock member which, at a time when it is sensed that a pull-out acceleration of the webbing has become greater than or equal to a predetermined acceleration, or at a time of rapid deceleration of a vehicle impedes rotation of the rotating member in the pull-out direction;

a pretensioner mechanism which, by being operated, rotates the rotating member in the take-up direction;

a force limiter including a single torsion bar for maintaining a load which is applied from the webbing to the vehicle occupant at a constant level, and an engaging member that is separate from the lock member which, due to operation of the pretensioner mechanism, is changed from a non-engageable state in which the engaging member cannot engage with the rotating member to an engageable state in which the engaging member can engage but does not engage with the rotating member until a rotational force in the take-up direction is applied to the rotating member and the single torsion bar of the force limiter, whereupon said engaging member immediately engages with and impedes the rotating member from rotating.

* * * * *